(12) United States Patent
Westerfield et al.

(10) Patent No.: US 7,817,179 B2
(45) Date of Patent: Oct. 19, 2010

(54) METHODS AND APPARATUS FOR STORING ALIGNMENT INFORMATION IN A BI-DIRECTIONALLY SCANNING ELECTROPHOTOGRAPHIC DEVICE

(75) Inventors: Eric W. Westerfield, Verailles, KY (US); Craig P. Bush, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 598 days.

(21) Appl. No.: 11/511,748

(22) Filed: Aug. 29, 2006

(65) Prior Publication Data

US 2008/0055393 A1    Mar. 6, 2008

(51) Int. Cl.
B41J 2/47      (2006.01)
B41J 15/14     (2006.01)
B41J 2/435     (2006.01)
G02B 26/08     (2006.01)

(52) U.S. Cl. .................. 347/243; 347/235; 347/250; 359/197.1; 359/204.1; 359/212.1; 359/213.1; 359/214.1; 359/223.1

(58) Field of Classification Search ............... 347/235, 347/243, 250, 259; 359/197, 203, 212, 213, 359/214; 399/44
See application file for complete search history.

(56) References Cited

U.S. PATENT DOCUMENTS

| | | | |
|---|---|---|---|
| 2004/0119002 A1 | 6/2004 | Bush et al. | |
| 2004/0119811 A1 | 6/2004 | Bush et al. | |
| 2004/0119813 A1* | 6/2004 | Bush et al. | 347/259 |
| 2004/0125198 A1 | 7/2004 | Klement | |
| 2004/0263937 A1* | 12/2004 | Fujii et al. | 359/212 |
| 2005/0185235 A1 | 8/2005 | Cannon et al. | |
| 2006/0064019 A1 | 3/2006 | Bush et al. | |
| 2006/0114309 A1 | 6/2006 | Bush | |
| 2006/0245009 A1* | 11/2006 | Akiyama et al. | 358/474 |
| 2007/0012875 A1* | 1/2007 | Miyazawa | 250/234 |
| 2008/0055389 A1 | 3/2008 | Bush et al. | |
| 2008/0055392 A1 | 3/2008 | Bush et al. | |

* cited by examiner

*Primary Examiner*—Matthew Luu
*Assistant Examiner*—Kendrick X Liu

(57) ABSTRACT

In a bi-directionally scanning electrophotographic (EP) device, methods and apparatus include storing alignment information. In one aspect, pre-characterization parameters of the EP device are stored in memory, such as NVRAM, resistant to the removal of power. In another, actual parameters of the EP device are learned during calibration and stored in the same memory. A controller has local or remote access to the memory and makes comparisons of the pre-characterized and learned parameters to implement corrections. Especially, scan alignment corrections are implemented to alter future scanning of scan lines of latent images on a photoconductor whereby the scan lines are formed in alternating directions. Certain contemplated parameters include, but are not limited to, a scan detect to print distance from a sensor to the start of imaging, temperature, pressure, a scanning mechanism drive signal parameter, such as pulse width, or sensor delay information.

8 Claims, 13 Drawing Sheets

FIG. 6A
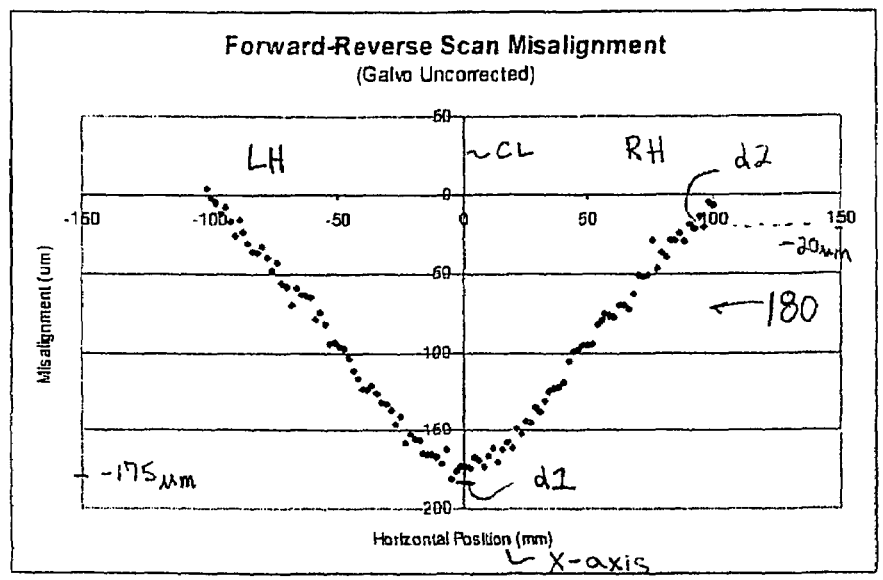
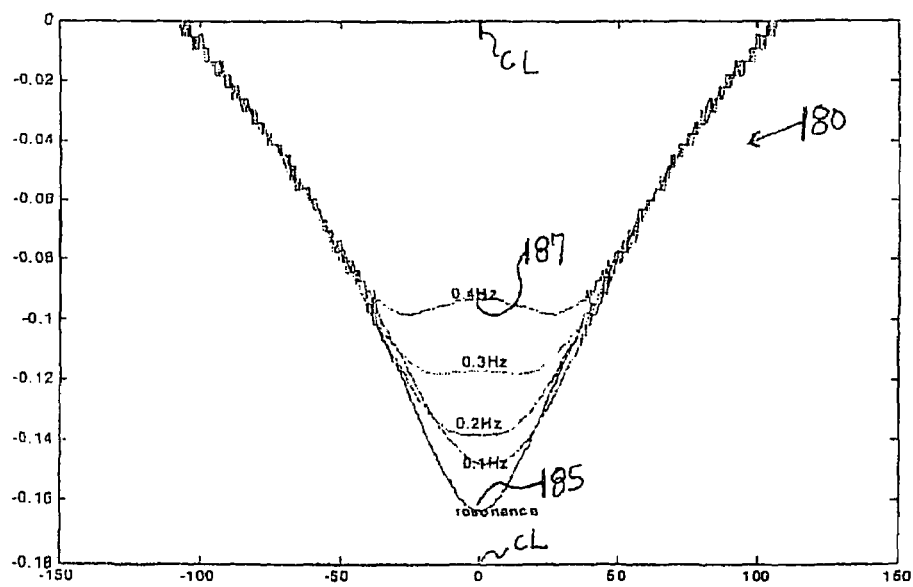
FIG. 6B

METHODS AND APPARATUS FOR STORING ALIGNMENT INFORMATION IN A BI-DIRECTIONALLY SCANNING ELECTROPHOTOGRAPHIC DEVICE

FIELD OF THE INVENTION

Generally, the present invention relates to electrophotographic devices, such as laser printers or copy machines. Particularly, it relates to improving print quality in electrophotographic devices, especially those utilizing bidirectional scanning. In one aspect, pre-characterized and learned parameters are stored in memory resistant to power loss. In another, a controller has local or remote access to the memory to make comparisons of parameters. Ultimately, corrections are implemented from the parameters to improve print quality.

BACKGROUND OF THE INVENTION

Traditional electrophotographic (EP) devices have a spinning polygon mirror that directs a laser beam to a photoconductor, such as a drum, to create one or more scan lines of a latent to-be-printed image. Recently, however, it has been suggested that torsion oscillator or resonant galvanometer structures can replace the traditional spinning polygon mirror and create scan lines in both the forward and reverse directions (e.g., bi-directionally), thereby increasing efficiency of the EP device. Because of their MEMS scale size and fabrication techniques, the structures are also fairly suggested to reduce the relative cost of manufacturing. Unfortunately, scanning in two directions adds a measure of complexity to image referencing since reference points need occur for each of the forward and reverse scans at opposite ends of the printed page and the slightest of deviations amplifies print image imperfections. Delays in reference sensors further complicate the process.

Also, any asymmetry in the motion of the oscillator or galvanometer results in errors in print linearity and line-to-line registration across the printing area. In this regard, there is first a notable drawback in the discontinuous nature by which forces are applied to the galvanometer or oscillator and asymmetric distortion of laser scanning motion can be introduced if left uncontrolled. Second, since the mechanical properties of the constituent materials that compose the galvanometer or oscillator are influenced by temperature, and the damping of the motion is dependent on air density (in turn, a result of both temperature and pressure, where pressure varies with altitude, for instance), it is clear that ambient operating conditions affect the shape and magnitude of the linearity and misalignment of scan lines. Thus, print quality changes occur as a result of changes in operating altitude, temperature or from occurrences of severe weather, for example.

Accordingly, there exists a need in the art for characterizing the manner in which bi-directionally scanning EP devices should operate according to various component characteristics and operating conditions. Particularly, there are needs by which knowing the actual characteristics and operating conditions of the EP device will relate to making corrections to improve print quality, such as aligning forward and reverse bi-directional scan lines. Ultimately, the need extends to efficaciously retaining the information so that it can be easily retrieved to implement the print quality corrections. Naturally, any improvements should further contemplate good engineering practices, such as relative inexpensiveness, stability, low complexity, ease of implementation, etc.

SUMMARY OF THE INVENTION

The above-mentioned and other problems become solved by applying the principles and teachings associated with the hereinafter described storing alignment information of bi-directionally scanning electrophotographic (EP) devices, such as laser printers or copier machines, so that corrections can be implemented. In a most basic sense, an EP device is pre-characterized such that various parameters can be compared to actual parameters of the EP device. A controller makes the comparison and does so via access to memory resistant to the removal of power where the parameters are stored. In this manner, safe storage is obtained so that accurate calibration of the EP device is achieved. Ultimately, hard copy printed image outputs will have high quality.

In a bi-directionally scanning electrophotographic (EP) device, methods and apparatus include storing alignment information. In one aspect, pre-characterization parameters of the EP device are stored in memory, such as NVRAM, resistant to the removal of power. In another, actual parameters of the EP device are learned during calibration and stored in the same memory. A controller has local or remote access to the memory and makes comparisons of the pre-characterized and learned parameters to implement corrections. Especially, scan alignment corrections are implemented to alter future scanning of scan lines of latent images on a photoconductor whereby the scan lines are formed in alternating forward and reverse directions. Certain contemplated parameters include, but are not limited to, a scan detect to print distance from a sensor to the start of imaging, temperature, pressure, a scanning mechanism drive signal parameter, such as pulse width, or sensor delay information.

Representative EP devices also contemplate various arrangements of sensors, photoconductors, laser, controllers, resonant galvanometers, torsion oscillators, etc.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 6A and 6B are graphs in accordance with the present invention of empirical and theoretic misalignment data representative of potential misalignments in a bi-directionally scanning EP device;

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention. In accordance with the present invention, the storing of alignment information in a bi-directionally scanning is hereafter described.

Figure 1:
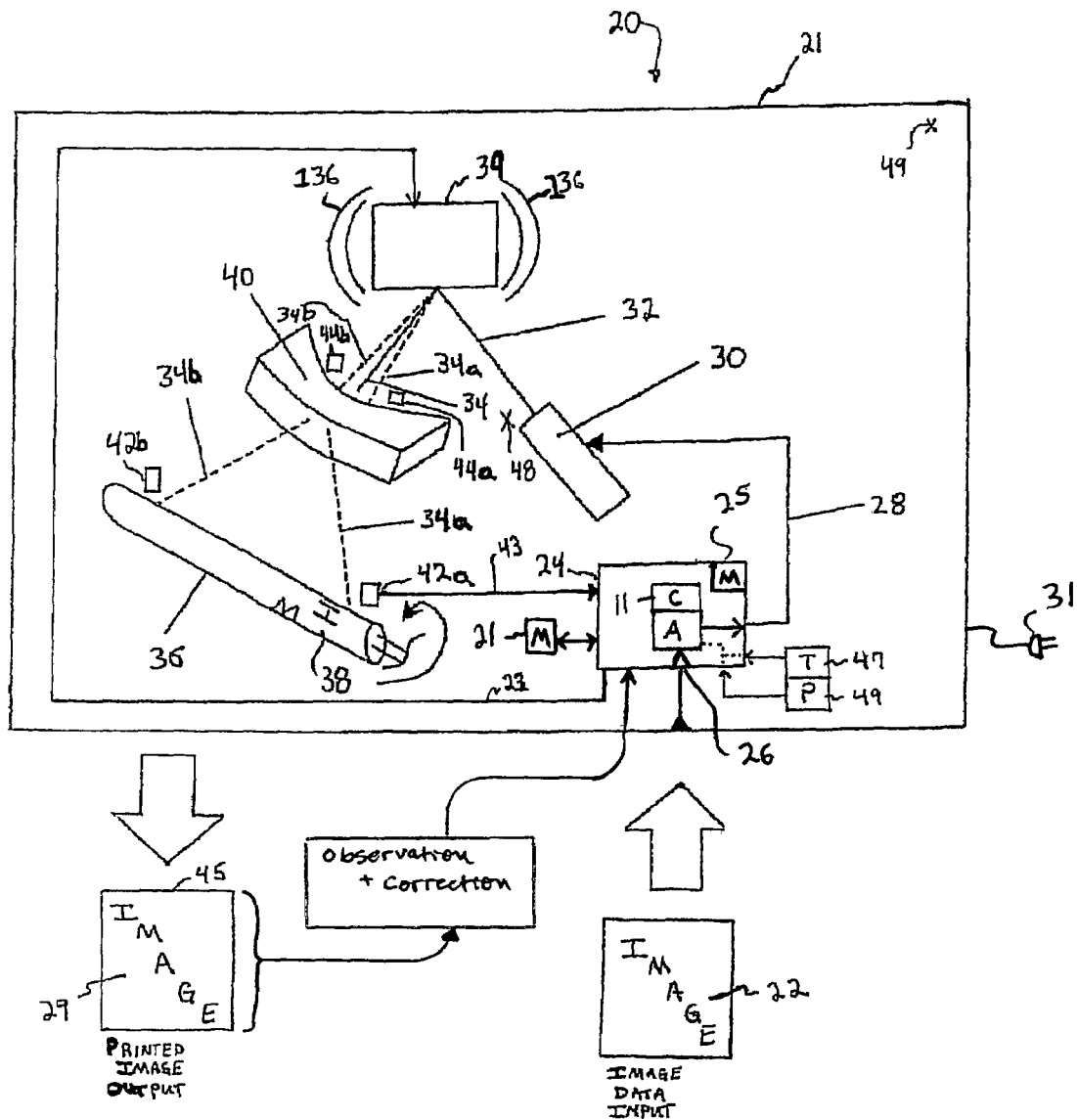
FIG. 1 is a diagrammatic view in accordance with the present invention of a representative bi-directionally scanning EP device.

With reference to FIG. 1, an EP device 20 of the invention representatively includes mono or color laser printers or copier machines. During use, image data 22 is supplied to the EP device from somewhere external, such as from an attendant computer, camera, scanner, PDA, laptop, etc. A controller 24 receives the image data at an input 26 and configures an appropriate output, video signal 28 to produce a latent image of the image data. In turn, a hard-copy printed image 29 of the image data is obtained from the latent image. If print alignment and operating conditions of the EP device are well calibrated, the printed image 29 corresponds nearly exactly with the image data input 22. If not, the printed image has poor quality, especially in the form of a variety of misalignments.

With more specificity, the output, video signal 28 energizes a laser 30 to produce a beam 32 directed at a scanning mechanism 39, such as a torsion oscillator or resonant galvanometer. As the oscillator or galvanometer moves (indicated by oscillation wave lines 136) the beam 32 is reflectively cast to create beam lines 34a, 34b on either side of a central position 34. As a result, multiple scan lines in alternate directions are formed on a photoconductor 36, such as a drum, and together represent a latent image 38 of the image data supplied to the controller. Optically, certain lenses, mirrors or other structures 40 exist intermediate to the photoconductor to transform the rotational scan of the laser beam reflected from the oscillator or galvanometer 39 into a substantially linear scan of the beam at the photoconductor 36, with substantially uniform linear scan velocity and with substantially uniform laser beam spot size along the imaging area of the drum. To provide common reference for the beam lines, various sensors are employed. Preferably, a forward hsync sensor 42a and a reverse hsync sensor 42b are positioned near opposite ends of the photoconductor to provide a common reference for all forward scanning beam lines and all reverse scanning beam lines, respectively. In addition to, or in lieu of the sensors 42a, 42b, forward and reverse hsync sensors may be positioned at 44a and 44b, upstream of the representative optics 40. Alternatively still, a single hsync sensor might be used with one or more mirrors placed variously to act as a second hsync sensor. Regardless, the outputs of these sensors (representatively given as line 43 from hsync sensor 42a are supplied to the controller 24 for referencing correct locations of the scan line(s) of the latent images. Downstream of the latent image, the printed image is formed by applying toner to the latent image and transferring it to a media, such as a sheet of paper. Thereafter, the media 45 with the printed image 29 exits the EP device, where users handle it for a variety of reasons.

Unfortunately, the printed image 29 is not always an accurate representation of the image data input 22 and various operations are employed to tightly calibrate the EP device. In this regard, a temperature and pressure sensor 47 and 49 are provided to supply input to the controller to correct the EP device per ambient operating conditions, such as pressure and temperature. A controller function or algorithm A then uses the obtained pressure and temperature to implement a correction in the output, video signal 28 from the supplied image data input signal at 26. In placement, the sensors can typify any location internal or external to the EP device although both are shown generally nearby the controller, within a housing 21. However, a more likely position for the temperature sensor 47 is that of nearby the laser beam 30 at position 48, for instance, to better ascertain the temperature of the structures that actually form the scan lines of the latent image. As a corollary, a more likely position of the pressure sensor is that of relatively far away from any moving structures able to influence airflow, such as at position 49, so that pressure readings are not unduly influenced by fluctuating air. In form, the temperature sensor may representatively embody items such as a temperature sense resistor, a thermocouple, a thermistor, or any other detector influenced by thermal variations. Pressure sensors, on the other hand, may representatively embody items such as a diaphragm, a transducer, a capacitor, or any other detector influenced by pressure variations. To avoid relative cost, the pressure may be also inferred from other components of the EP device without need of taking direct pressure readings from sensor 49.

As it relates to determining print aligning of the EP device, the printed image 29 is observed in some fashion and a correction implemented so that future scan lines of future latent images are altered to make the printed image appear as close to the image data input as possible. In essence, the observation and correction is a feedback loop. As shown, the image is observed at 46 and a correction indicated to the EP device 20. In one instance, this corresponds to an end-user making a visual observation of the printed image and informing the EP device, such as by way of a user interface of an attendant computer (not shown) or an operator panel directly on the EP device, of a preferred correction. In another, a reading of the printed image occurs and an automated selection is made and conveyed to the EP device. Reading, as is well known, can occur by way of optical scanners, cameras or other devices. In still another instance, the observation and correction occurs internal to the EP device such as by observing a printed image still in the EP device or by observing the latent image 38 on the photoconductor. Corrections C 11 then occur by way of selection in the controller 24. Naturally, observation and correction can occur relative to any image or a specially made calibration page that manufacturers, service technicians or end-user operators employ as part of a manufacturing, servicing or end-user act for aligning print.

In any event, the controller 24 communicates with local 25 and/or remote 27 memories M for both the pre-characterized parameters of the EP device and the learned parameters of the EP devices, such as those received during a calibration cycle. In that the EP device is typically tethered to an external source of power, such as AC power by way of plug 31, or an internal source of power, such as a DC battery, it is important that the memories be resistant to loss of power, such as from unplugging, power failure, or the like. Thus, the memories contemplate examples of non-volatile (NV) memories, such NV random access memory (NVRAM), NV read-only memories (NVROM) or other power loss resistant memory. Ultimately, the controller accesses one or more of the memories, retrieves the appropriate data and implements a variety of corrections to overcome the potential misalignment problems of FIGS. 2B-2D.

Figure 2A:
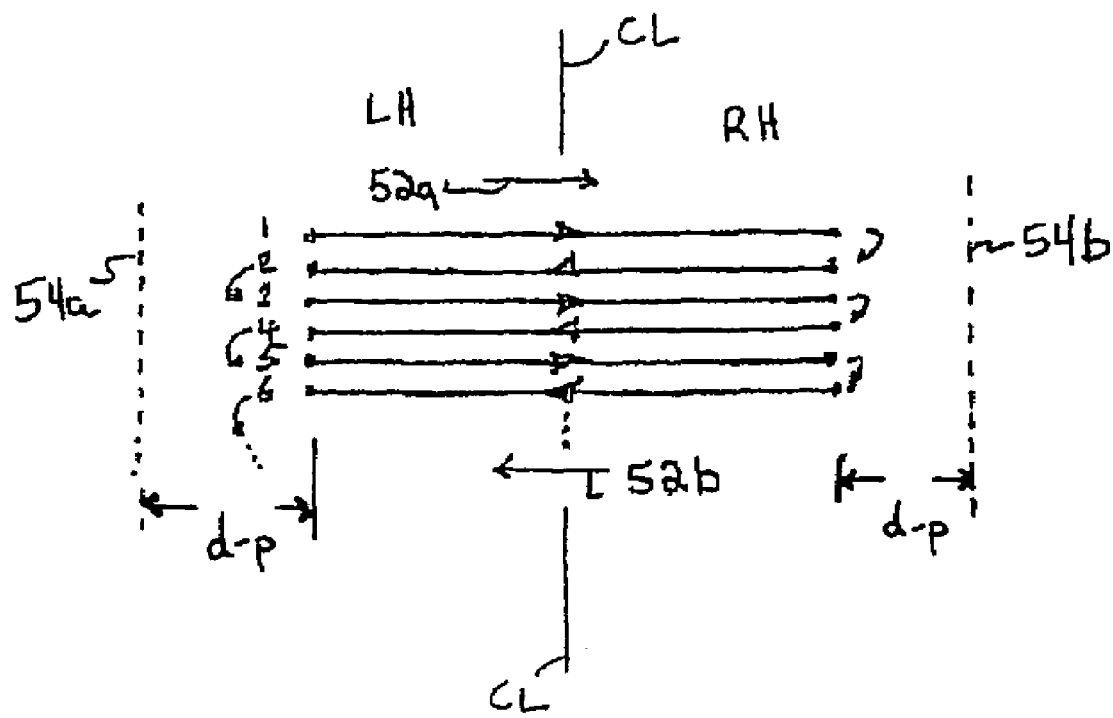
FIGS. 2A-2D are diagrammatic views in accordance with the present invention of desirable scan lines and reference positions in a bi-directionally scanning EP device and representative potential scan misalignments of same.

Before then, however, FIG. 2A conceptually shows the desired scan lines and reference positions in a bi-directionally scanning EP device and fairly suggests the nomenclature for use with later figures. Namely, a plurality of scan lines forming a latent image on a photoconductor, for example, are sequentially numbered 1-6, with odd numbered scan lines (1, 3, and 5) occurring in a forward scan direction 52a opposite the even numbered scan lines (2, 4, and 6) occurring in a reverse scan direction 52b. Also, the forward and reverse scan lines alternate with one another and such is the nature of scanning with the torsion oscillator or resonant galvanometer and its attendant formation of forward-scanning beam lines 34a and reverse-scanning beam lines 34b. Also, the reference position 54a supplies a common reference point for each of the forward scanning lines and is borne about by the signal from the forward hsync sensor 42a. Conversely, the reference position 54b supplies a common reference point for each of the backward scanning lines and is borne about by the signal from the reverse hsync sensor 42b. A scan detect to print distance d-p is also shown for each of the forward and reverse scan lines and represents one potential parameter for storage in the memories that the controller accesses to implement corrections. In practice, this is a distance from an hsync sensor to the start of imaging on the photoconductor.

Figure 2B:
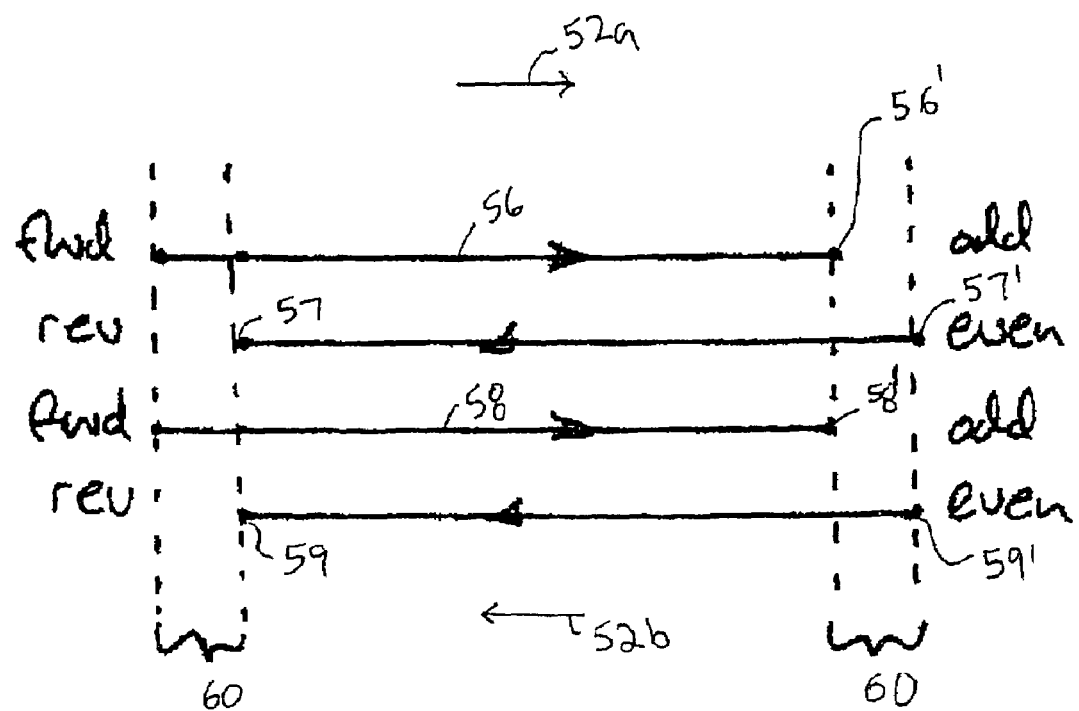
Figure 2C:
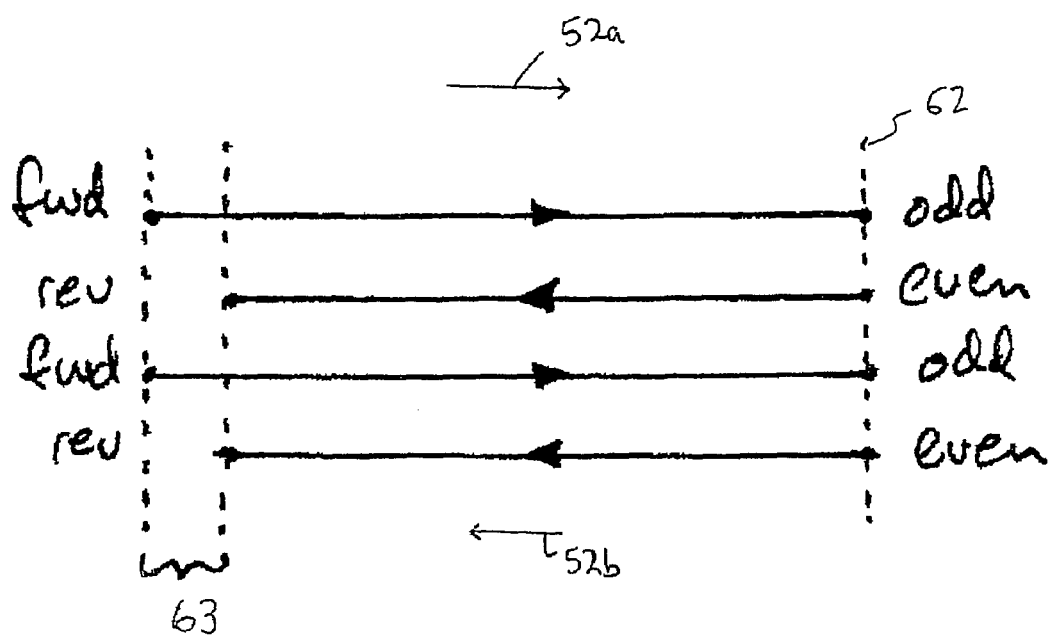
Figure 2D:
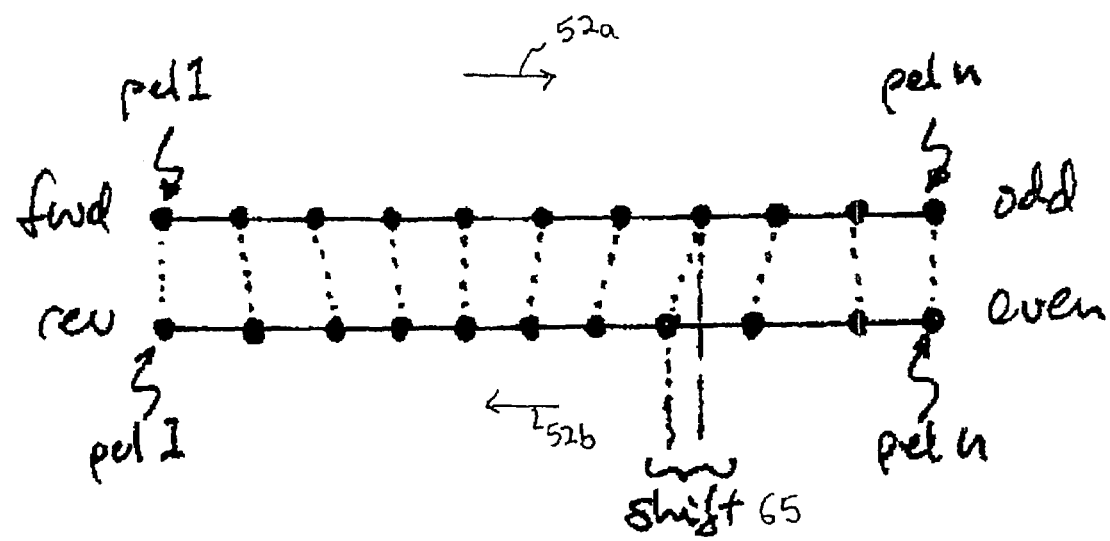

In FIGS. 2B-2D, the potential misalignments of bi-directional scans in an EP device may be classified into three basic categories. In the first (FIG. 2B), the end points 56', 58' of forward (fwd) scan lines 56, 58 do not coincide with the start points 57', 59' of reverse (rev) scan lines 57, 59 and is known herein as straight bi-directional misalignment. The scan lines are all also of relatively equal length thereby creating a nearly equal amount 60 of misplacement at each end of the scans. In the second (FIG. 2C), line length mismatch occurs. That is, the forward and reverse scan lines are aligned on one side 62, but not on the other side where an amount 63 of mismatch occurs. In a typical embodiment, this is the result of forward and reverse scan lines having differing lengths. In the third (FIG. 2D), differential nonlinearity is observed. Namely, printed pels (pel #1-pel #n) within each forward or reverse scan normally have equal spacing. However, if there are differences in the linearity of pel placement between forward and reverse scans, there will be individual shifts 65 in the placement of sets of pels that occur in the same scan location among scans as shown. To the extent misalignment occurs in an actual bi-directionally scanning EP device, skilled artisans will appreciate that most misalignments take the form of some combination of more than one of the foregoing types. To this end, the controller implements corrections to overcome scan misalignment by retrieving and comparing pre-characterized and learned parameters stored in memory resistant to power loss.

Figure 3A:
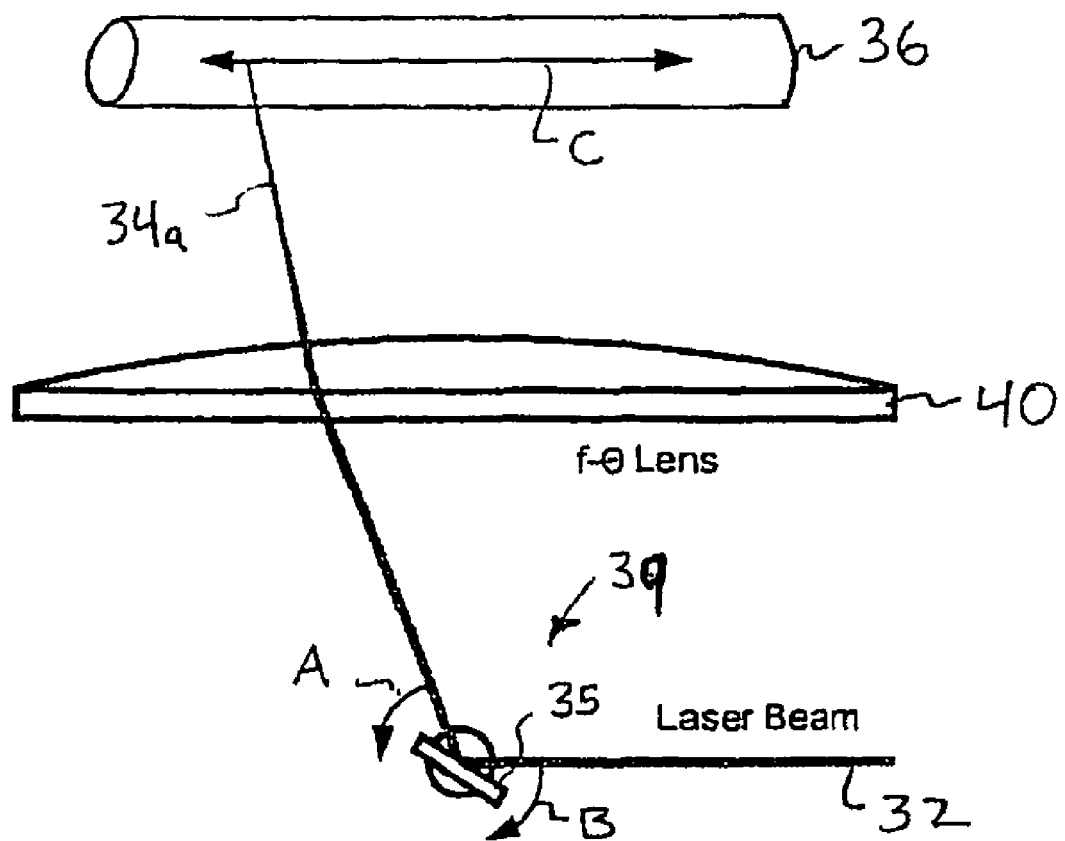
FIG. 3A is a diagrammatic view in accordance with the present invention of a more detailed version of a scanning mechanism of the EP device of FIG. 1.

With reference to FIG. 3A, a slightly more detailed version of the scanning mechanism 39, such as a galvanometer or oscillator, of the EP device is shown. In this regard, the scanning mechanism includes a reflective surface 35, such as a mirror, that is caused to rotate about a central pivot point in either a first direction given by arrow A or in an opposite direction given by arrow B. The laser beam 32 upon hitting the reflective surface is then caused to impinge upon the photoconductor 36 to make scan lines of a latent image in opposite directions given by bidirectional arrow C. Also, drive means (not shown) exert a torque on the scanning mechanism to push it, so to speak, to rotate (in either the direction of arrow A or B). In this regard, the torque occurs for a relatively short period of time, but adds a sufficient amount of energy to the system of the scanning mechanism so that both a right half of a forward scan and a right half of a reverse scan is produced by a single push. Thereafter, upon the scanning mechanism reaching a corresponding mid-point or centerline of its scan line, the scanning mechanism is similarly pushed (now in the opposite direction of either arrow A or B) to complete the left half of the reverse scan line, followed by the left half of the forward scan line. Over time, the process repeats and multiple scan lines are produced. By analogy, the scanning mechanism is akin to a pendulum that gets pushed in both a forward and reverse direction. By operation of gravity and other forces, the pendulum reverses direction on its own as it transitions from the forward to the reverse directions at the apex. To keep the pendulum swinging, pushes are occasionally given. Diagrammatically, the halves of the scan lines are seen in FIG. 2A according to the right half RH and left half LH appearing on opposite sides of a centerline CL. To gain the inherent advantage of the system, it is also the case that the frequency of the push of the scanning mechanism (or pendulum, by analogy) is appropriately provided to resonate the scanning mechanism at its resonant frequency.

Figure 3B:
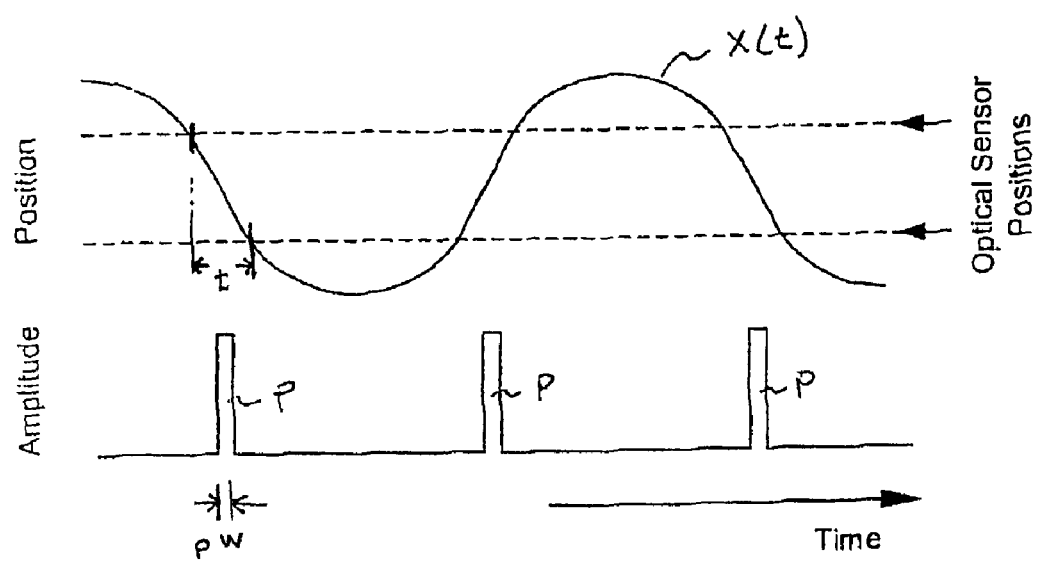
FIG. 3B is a graph in accordance with the present invention of desirable sinusoidal and pulsed drive signals for the scanning mechanism of FIG. 3A.

With reference to FIG. 3B, the ideal motion of a laser spot of a laser beam on a photoconductor produced by a scanning mechanism driven by an appropriate electronic driver is described by the sinusoidal equation:

$$x(t)=A \cdot \sin(\omega \cdot t) \qquad \text{Equation 1;}$$

where x(t) is the instantaneous lateral position of the laser beam, with x=0 occurring at the centerline (CL, FIG. 2A) of the scan, A being the maximum excursion of the beam, ω being the radian frequency of the motion, and t being the time. Akin to the pendulum analogy, the driver controls the amplitude and frequency of the motion, but the most efficient operation occurs if the scanning mechanism is driven or pushed at or near its natural resonance point. While the actual motion of the laser beam is affected by several factors, including for example, (1) the drive method and configuration of the scanning mechanism, (2) nonlinear damping of the scanning mechanism, (3) misalignment of the scanning mechanism, and (4) nonlinearity of various optics in the EP device (such as element 40), near-ideal motion can be obtained if the drive mechanism could, indeed, follow the x(t) curve (assuming the optics are designed according to x(t)). However, design constraints generally make such impractical or economically unfavorable.

Thus, the more practical drive approach is shown via a sequence of pulses P, each of which causes a corresponding force to be imparted to the scanning mechanism to make it resonate at its resonant frequency. Such also occurs by imparting an electromagnetic, electrostatic or other force and coupling it to the scanning mechanism via an appropriately positioned electromagnetic, electrostatic, or other coupling receiver (not shown). While the amplitude of the pulses is fixed, the duration pw of each pulse can be dynamically varied to maintain consistent scan times as measured by optical sensors, (e.g., hsync sensors) according to the shown time t, which intercept the scanning laser beam on either end of the scan lines. In general, however, the wider or longer the pulse width, the greater the compensation for air resistance in the operating environment is that which is observed. Conversely, the shorter the pulse width, the lesser the compensation for air resistance in the operating environment is that which is observed. This drive scheme is also particularly well suited to a controller 24 of FIG. 1 contemplative of a digital control system in which a digital controller (e.g. microcontroller, microprocessor, DSP, ASIC, or FPGA) is designed to provide pulses of precise duration and timing to the scanning mechanism, such as along control line 23, and to accurately measure the timing of feedback signals, e.g., line 43, from the sensors. Also, while measuring the difference between the times that the laser beam strikes a first sensor at one end of the photoconductor to the time that it strikes a second sensor at the opposite end, the controller can maintain a constant laser beam transit time across the printing area by varying the width of each of the drive pulses. A procedure can then be used to locate the precise resonance frequency by stepping through a range of frequencies and determining which frequency results in the narrowest or shortest pulse widths.

In other words, under normal resonant operation of a scanning mechanism, the width of the pulses required to properly drive the mechanism will vary as a function of the device efficiency and environmental factors, including temperature and pressure. For example, as air pressure decreases as a result of changes in altitude or changes in weather conditions, the density of the air will decrease, and therefore the amount of damping presented to the mechanism will likewise decrease as a result of reduced air resistance. It will therefore require less energy, and correspondingly shorter drive pulses to maintain the same scan transit time. Any or all of the foregoing represent pre-characterized or learned parameters of the memory that the controller can access to implement corrections.

Figure 4A:
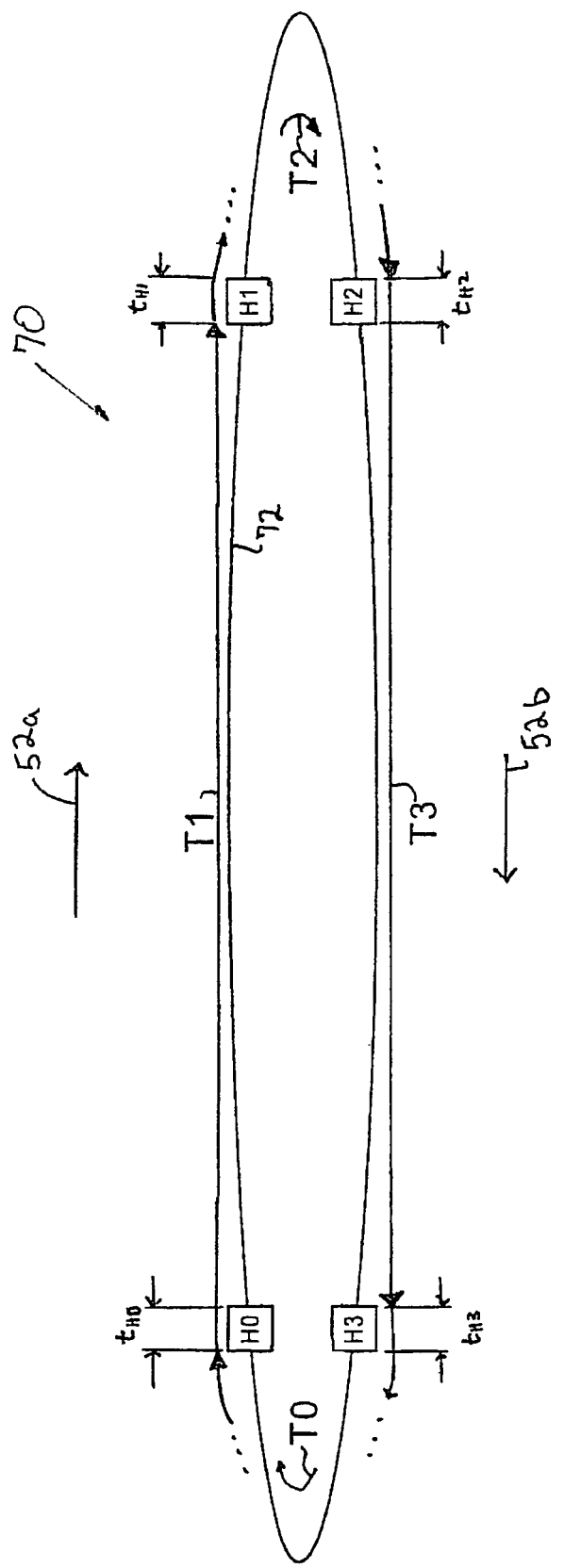
FIG. 4A is a diagrammatic view in accordance with the present invention of the timing relationship between various horizontal synchronization (hsync) sensor signals in a bi-directionally scanning EP device.

With reference to FIG. 4A, a simplified, conceptual timing diagram relative to hsync sensor signals in an EP device is given generally as 70. Namely, there exists four time periods T0, T1, T2 and T3 that are regularly repeated as a laser beam scans back and forth in a bi-directionally scanning EP device. The time periods are also divided relative to the electrical signals of four hsync sensors, given as H0, H1, H2, and H3, that are asserted by the sensors upon being sufficiently impinged upon by the laser beam. As before, however, four actual sensors can exist to create the signals or some other optical equivalent whereby one or more hsync sensors, and deliberately positioned mirrors, lenses, etc., enable the creation of four discrete hsync sensor signals while fewer than four actual sensors exist. Also, the diagram 70 is that of a timing chart superimposed upon the notion that a laser beam scans in the EP device in a first forward direction of scan travel 52a from a first position (e.g., 54a, FIG. 2A) referenced by a first hsync sensor signal (HO) to a second position (e.g., 54b, FIG. 2A) referenced by a second hsync sensor signal (H1). This is also known as time T1. Such time is also fixed, known and controlled (closed loop) by the controller of the EP device. From there, the laser beam slows and reverses course to begin a second scan in a reverse direction of scan travel according to direction 52b and this time is known as T2.

From there, time T3 corresponds to a laser scan in a second reverse direction of scan travel 52b from a second position (e.g., 54b, FIG. 2A) referenced by a third hsync signal (H2) back to the first position (e.g., 54a, FIG. 2A) referenced by a fourth and final hsync sensor signal (H3). From there, the laser beam slows and reverses course to begin another scan in the forward direction of scan travel 52a and such is referenced by the H0 sensor signal beginning again. Of course, this process repeats often during scanning, given by loop 72, and the diagram shows that per every cycle of the galvanometer or oscillator (e.g., 39, FIG. 1) the laser beam (either 34a or 34b, FIG. 1) crosses one or more hsync sensors such that four hsync sensor signals are created, each labeled H0 through H3. In turn, four distinct and regularly repeated time periods T0 through T3 occur per each cycle of the galvanometer or oscillator and such will be used in determining sensor delay. Time periods T1 and T3 also represent a portion of the time during which the laser beam scans across the imaging region of the photoconductor. Lastly, the time length of the sensor signals H0, H1, H2, and H3 is also representatively given as a time of length tH0, tH1, tH2 and tH3, respectively.

Figure 4B:
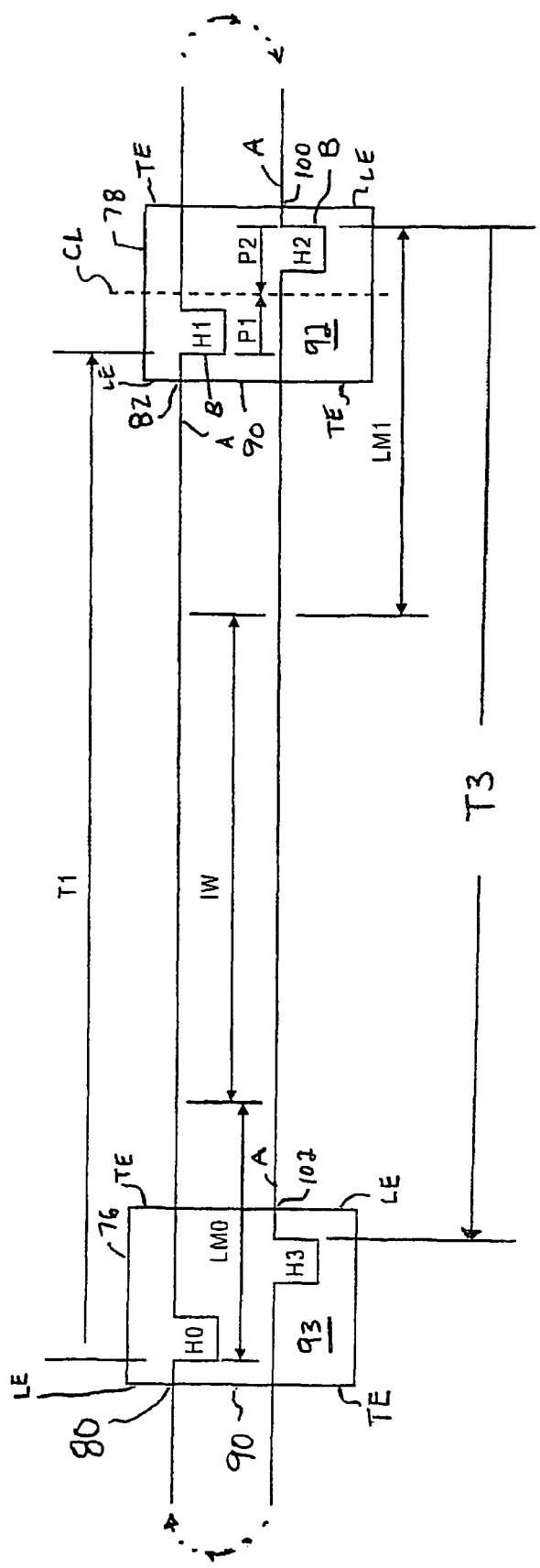
FIG. 4B is a timing diagram in accordance with the present invention of various hsync signals with superimposed hsync sensors in a bi-directionally scanning EP device.

With reference to FIG. 4B, the conceptual timing diagram of FIG. 4A is enhanced according to a superimposed physical notion of hsync sensors 76 and 78. That is, while time T1 is still a fixed, known and controlled time beginning upon the assertion of an electrical signal H0 by an hsync sensor (e.g., forward hsync sensor FIG. 1), and ending upon the assertion of a next electrical signal H1 by an hsync sensor (e.g., reverse hsync sensor, FIG. 1), there exists a portion of time, beginning at point 80, to the actual assertion of the hsync sensor signal at H0 that relates to the characterization of the sensor as a laser beam passes along the sensor. Similarly, there exists a portion of time, beginning at point 82, to the actual assertion of the hsync sensor signal at H1 that relates to the characterization of the sensor as a laser beam passes along this other sensor. Namely, a laser beam is turned on at least as of some point A before crossing a periphery 90 of an hsync sensor 92. (Skilled artisans will appreciate that after imaging a scan line of image input data in an EP device, but before the laser beam would otherwise reach the hsync sensor, the laser beam is turned off so that ghost or other dissatisfactory images do not appear in the latent image being produced. But, because the laser beam needs to be on for an hsync sensor to assert its signal, the laser beam is turned back on at some point in its direction of travel, such as at A, so the hsync sensor signal can indeed be asserted for purposes of registering alignment. To the extent hsync sensors miss the passage of the laser beam, and exert no signal, controllers stand ready to issue a false hsync sensor signal during a time window of hsync sensor signal expectancy so that ASIC firmware or other controller software does not get "lost" in its scanning of latent images.) Over time, the laser beam follows along the sensor in the direction of scan travel defined from a leading edge LE of the sensor to a trailing edge TE. However, a time delay exists from when the laser beam first impinges upon the sensor 92 at the leading edge to when the sensor itself, according to inherent properties of the sensor, recognizes the presence of the laser and concludes it has been sufficiently impinged upon by the laser beam to affirmatively assert an electrical signal, such as H0 or H1. The delay, therefore, is that which exists in the timing diagram of FIG. 4B between points 80 and 82 and the start of hsync sensor signals H0 and H1, respectively. Also, the position of the laser beam on the sensor at the time when the sensor asserts its signal, occurs at position B and such is labeled the "apparent leading edge" of the sensor.

Similarly, on the return trip of the laser beam to create a reverse scan line, during time T3, another time delay exists from when the laser beam first impinges upon the sensor 92 at the leading edge to when the sensor itself, according to inherent properties of the sensor, recognizes the presence of the laser and concludes it has been sufficiently impinged upon by the laser beam to affirmatively assert an electrical signal, such as H2 or H3. Namely, the laser beam is turned on at least as of some point A before crossing a periphery 90 of the hsync sensor 92. Over time, it follows along the sensor in a direction of scan travel 94, defined from a leading edge LE to a trailing edge TE, and a delay, exists in the timing diagram of FIG. 4B between point 100 and the start of hsync sensor signal H2. (The same is also true for the time between point 102 and the start of hsync sensor signal H3 relative to another actual or virtual hsync sensor 93.) Also, the position of the laser beam on the sensor at the time when the sensor asserts its signal occurs at position B and such is labeled the apparent leading edge of the sensor.

As a further parameter, there exists a time P1 and P2 from the time of assertion of a respective hsync sensor signal H1 or H2 and a time when the laser beam itself is over a center of the sensor 92, given as centerline CL. By knowing these times, which were unknown heretofore, a precise imaging reference for forward and reverse scans in a bi-directionally scanning EP device can be fairly characterized. To ascertain these times, however, it is to be appreciated that some fixed point in space is needed. While this can be the leading edge, trailing edge, or any arbitrary point of the sensor, for example, the center is representatively chosen.

Continuing, the nomenclature of the center and the leading and trailing edges of the sensor has been described, as has been the apparent leading edge. What remains to be identified, in order to learn the times P1 and P2, is the "apparent trailing edge." In this regard, the apparent trailing edge is a last scan position at which the laser beam can be turned on such that an hsync sensor signal is still generated by the sensor as the laser beam is swept off the periphery 90 of the sensor at the actual trailing edge. In other words, the apparent trailing edge is a latest possible position of the laser beam, along the direction of laser scan travel, where the laser beam can be turned on and still have a signal sent from the sensor that indicates the sensor has been sufficiently impinged upon by the laser beam. In still other words, a position on the sensor slightly beyond the apparent trailing edge in a direction closer to the actual trailing edge, as the laser beam scans from the actual leading edge to the actual trailing edge, corresponds to a position where the sensor will have an insufficient amount of being impinged upon by the laser beam (for whatever reason) to actually assert a signal to a controller, or elsewhere. In turn, knowing both the apparent leading and trailing edges, and taking advantage of the symmetry of the sensor, the actual center of the sensor can be learned. Thereafter, this information is used to accurately reference the scan starting in an EP device.

To actually find the apparent leading and trailing edges, an automatic or user-initiated calibration cycle of the EP device is preferably entered. In this manner, the EP device can be regularly updated and synched. Since it has been estimated that the overall time for making the calibration is on the order of a few seconds, the cycle can be done at any time during manufacturing, servicing or end-user operation, and without much interference to otherwise creating actual image outputs. Naturally, any or all of the foregoing represent pre-characterized or learned parameters of the memory that the controller can access to implement corrections.

Figure 5:
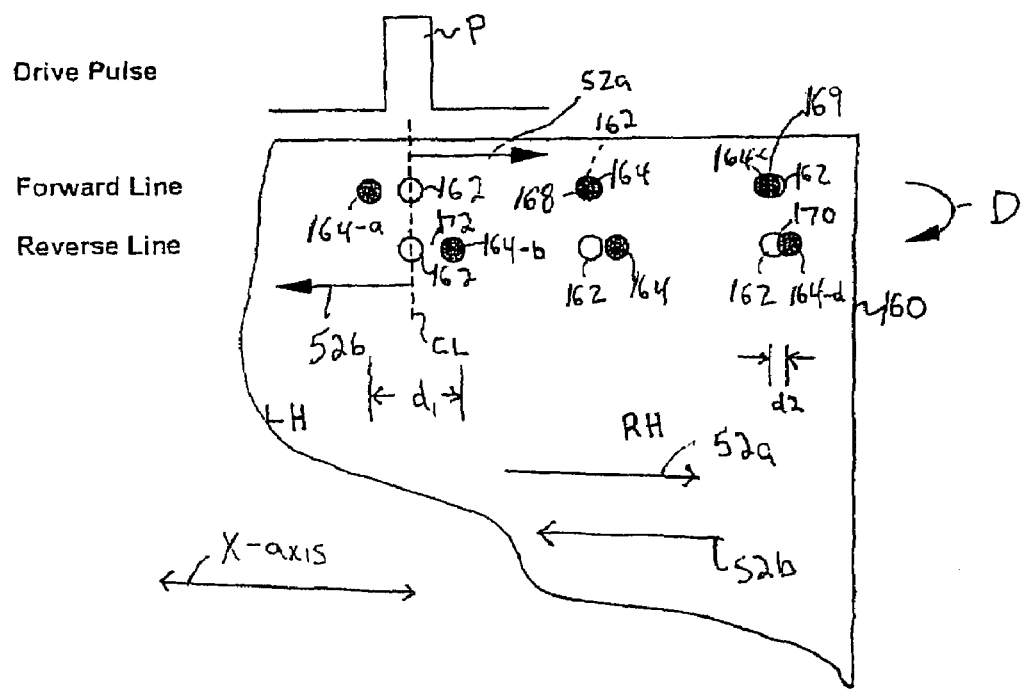
FIG. 5 is a diagrammatic view in accordance with the present invention of a representative distortion of a laser spot potentially occurring in the EP device of FIG. 1.

With reference to FIG. 5, it is desirable to monitor events to keep the application of force, to move the scanning mechanism, from being discontinuous in nature, especially according to ambient operating conditions. Namely, a drive pulse P for pushing a scanning mechanism is shown relative to how desired and undesired pixels (pels) occur on adjacent forward and reverse scan lines in a portion of the printing area 160. White circles 162 indicate ideal or desired pel locations, while solid or darkened circles 164 indicate actually printed pel locations. During use, when the drive pulse P is applied, there is a small deviation from the ideal scan. Damping caused primarily by air resistance slows the scanning mechanism as it moves through one half cycle (e.g., a right half RH of the printing area 160 relative to the centerline CL), which in turn causes successive pels to lag in the direction of travel, resulting in print nonlinearity. The amount of deviation between the ideal and actual pel locations, e.g., circles 162 compared to circles 164, respectively, increases over time as the effect of the applied force is damped. For instance, as the scanning mechanism creates a scan line in the forward direction toward the right half RH of the printing area 160 relative to the centerline CL, the darkened circle 164 and the underlying white circle 162 align and register fairly well at a position 168 near the centerline. As travel of the scan line progresses, however, the alignment and registration of the white and darkened circles begins varying at position 169, such that the ideal and the actual pels do not align perfectly. Continuing, the scan line reverses course from a forward direction 52a to a reverse direction 52b, according to the representative arrow D, and alignment and registration of the ideal and actual pels separates even further, such as at position 170. Ultimately, the mismatch between the ideal and actual is greatest near the centerline CL, such as near position 172, before scanning in the reverse direction occurs in the direction 52b for the left half LH of the printing area 160. As is then seen, the resulting linearity error varies across the scan lines, with the maximum error occurring at or near the centerline CL position at which the drive pulses occur. Moreover, nonlinearity produced in reverse scan lines is opposite in direction to that produced in forward scan lines, and therefore, a misalignment between pels on adjacent scan lines will occur with a maximum alignment error of double the linearity error.

Plotting this out, FIGS. 6A and 6B show empirical and theoretical results, respectively, resembling a "V" shaped curve 180 and 180'. In FIG. 6A, numerous sample points were obtained in creating curve 180 for an EP device and skilled artisans will observe that the closer the scan line is to the centerline, the worse the misalignment between the ideal and the actual pel locations. Because only actual pels can be measured relative to other pels, and not ideal pels relative to actual pels, the graph more precisely represents distances of misalignment relative to adjacent pels, and adjacent pels in adjacent scan lines (forward versus reverse scan line, and vice versa). Correlating back to FIG. 5, a distance d1 exists of about 175 microns between adjacent darkened circles 164-a and 164-b near the centerline CL. Further away from the centerline CL, however, the distance between pels is much closer together. In other words, the misalignment is less at distance d2 between adjacent darkened circles 164-c and 164-d compared to distance d1. Skilled artisans will also note that the horizontal position on the graph (x-axis) extends to about +/−100 mm in length. By converting to inches, a media of about 8.5 inches wide by 11 inches long has about +/−108 mm per each left and right half LH, RH of the 8.5 inches relative to centerline and a few millimeters per the 8.5 inch-wide media is unused. That is, about 8 mm per each of the left and right halves of the media are not printed on and, thus, has no misalignment and the empirical data only covers the +/−100 mm.

In FIG. 6B, it is shown that the theoretical curve 180' of misalignment corroborates the empirical curve 180 of misalignment. It also indicates that a scanning mechanism has worse misalignment near the centerline, at position 185 for instance, from a train of pulses attempting to drive at resonance because a non-resonant drive pulse actually begins pushing the scanning mechanism earlier than expected and the error or misalignment at position 187, for example, decreases relatively somewhat near the centerline. In any event, the curve maintains its "V" shaped profile with the greatest amount of misalignment occurring near the centerline. Naturally, this all assumes that pushing of the scanning mechanism occurs near the centerline. To the extent pushing was to occur elsewhere, such as at an end of a scan line, the errors would be greatest near the position where the push occurred, e.g., the ends.

Figure 7:
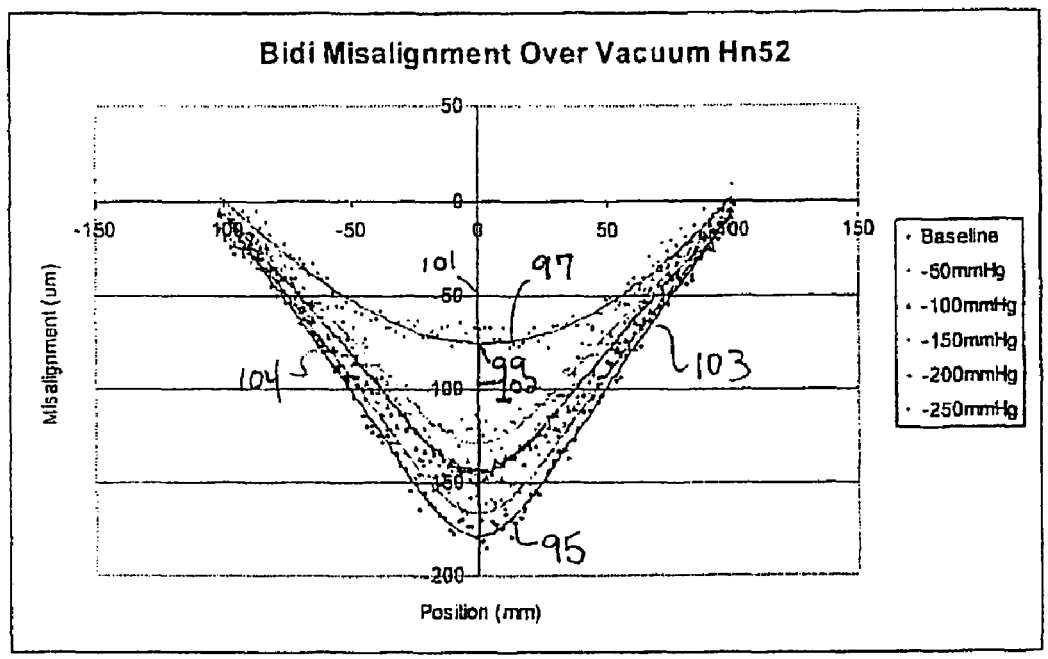
FIG. 7 is a graph in accordance with the present invention of empirical misalignment as a function of various pressures.

With reference to FIG. 7, a plurality of superimposed curves are given showing empirical or measured misalignment profiles changed as a function of relative air pressure reduction, which certainly occurs as a result of changes in altitude of the operating environment or from occurrences of severe weather. In this regard, a baseline plot 95 is given for a standard operating pressure, such as at 29.92 inches of mercury (Hg). Thereafter, the plots are given relative to the baseline in millimeters of mercury (Hg). As is apparent, the misalignment improves with lower pressure, or at higher altitude, such is given by plot 97. Relative to temperature changes, the apex of the V-shaped plots would either rise or lower from apex 99 to either an apex at position 101 or 102, respectively, as temperature increased or decreased, respectively. Accordingly, the least amount of misalignment of an EP device occurs at high altitudes in hot temperatures, while the greatest amount of misalignment occurs at sea level in cool temperatures. Lastly, the steepness of the V-shaped profile will flatten-out or "steepen-up" as will the legs 103, 104 of the profile have a variable amount of slope, as will be better defined below.

Figure 8:
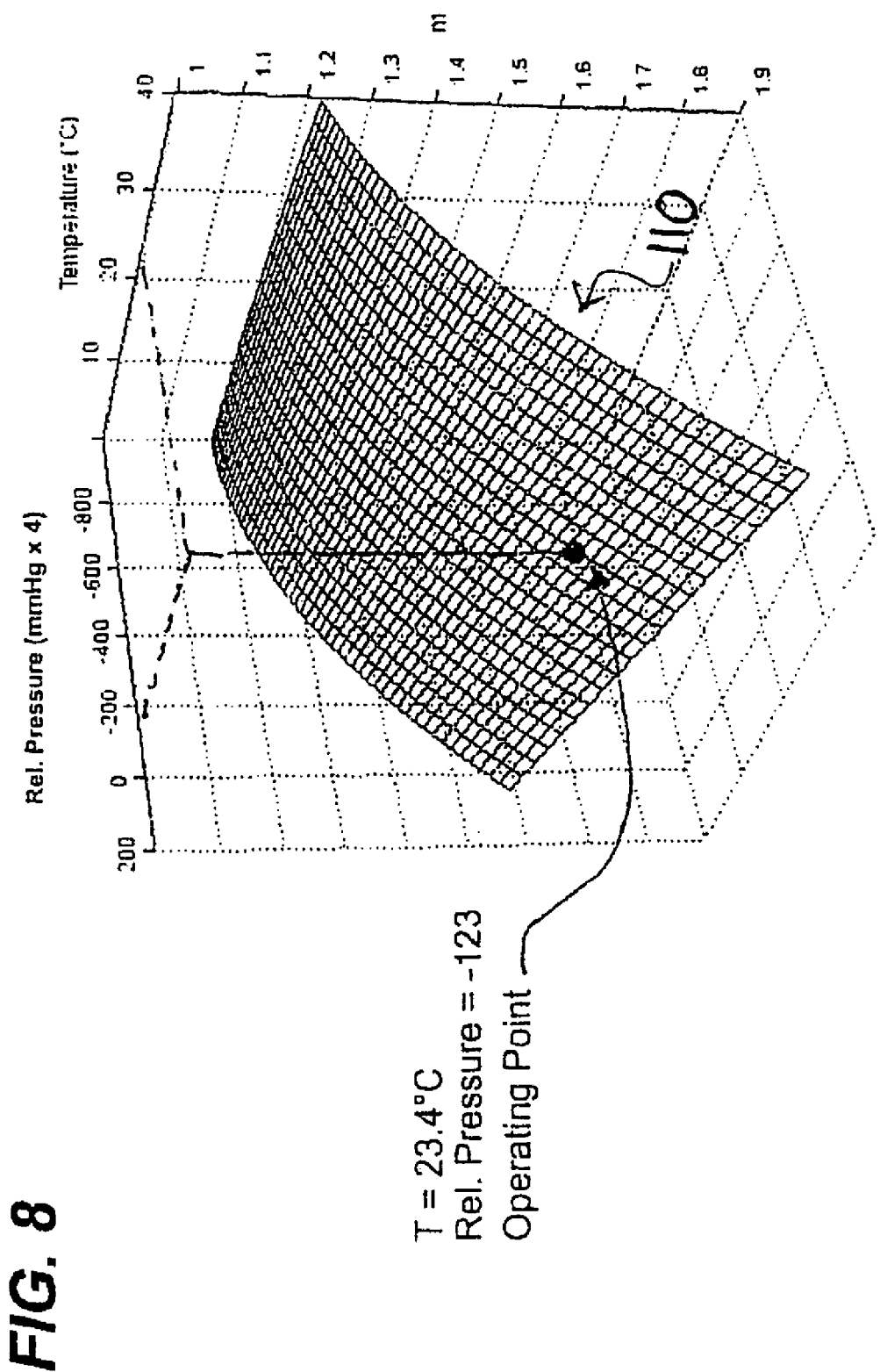
FIG. 8 is a surface plot in accordance with the present invention of a representative model pre-characterizing an EP device according to pressure and temperature.

Accordingly, the inventors have empirically and theoretically shown that misalignment gets better or worse according to various pressures and temperatures of an operating environment in which a mechanical structure of a bi-directionally scanning EP device is operated to create scan lines. With reference to FIG. 8, modeling or pre-characterizing this results in a surface plot, such as 110. Alternatively, the model could be expressed in forms such as functional, tabular, or algorithmic data, or a combination thereof so long as relationships between the measured or obtained independent variables (scan position, temperature, and pressure) and a dependent variable of interest (forward-reverse alignment error or linearity error) are known. Moreover, the model may be based on empirical measured data, on theoretical physical principles, or on a combination thereof.

As a working example of the model, consider the operating point shown. If it was ascertained that the temperature of the EP device was 23.4 degrees Celsius, and the pressure (relative to some baseline, as before) was −123, a slope amount m of about 1.6 could be ascertained. Relative to other models (not shown, but plotted representatively the same), a temperature and pressure entry point would also reveal a corresponding parameter of b (y-intercept of the V-shaped curve) and an "a" value corresponding to how sharp a transition the V-shaped curve makes (a high "a" value is a very pointy V-shape whereas a low "a" value is a more rounded V-shape at the apex).

In turn, plugging the obtained or ascertained variables (m, b and a) into an equation defining the V-shaped curves of FIGS. 6A and 6B, for instance, the amount of misalignment in a bi-directionally scanning EP device can be known. Representatively, the following equation has been observed to fairly well define the V-shape of the data and plugging the obtained variables (m, b and a) into it reveals a fair approximation of the amount of misalignment in an EP device.

$$y(x) = [((2^{(ax)} - 1)mx)/(2^{(ax)} + 1)) + b]$$ Equation 2;

where x is the relative horizontal position, e.g., the x-axis as previously shown. In turn, knowing the amount of misalignment per an operating condition of the EP device, such as pressure or temperature, skilled artisans can enter a correction to compensate for the misalignment in advance of the misalignment actually occurring in a printed image. Skilled artisans will also know how to correlate or convert the amount of misalignment (e.g., a first distance) to: 1) image data input, especially in the form of pixels (pels) of a fixed length (e.g., a second distance), such as 600 or 1200 dots per inch (dpi); or 2) pulse widths pw, so that the pixel information for scanning a latent image on a photoconductor is readily also known according to pressure and/or temperature (and a correction readily implemented). Naturally, any or all of the foregoing operating conditions, such as temperature or pressure, represent pre-characterized or learned parameters of the memory that the controller can access to implement corrections.

Finally, one of ordinary skill in the art will recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A bi-directionally scanning electrophotographic device, comprising;
  a photoconductor for being impinged with a plurality of scan lines formed in alternating directions to create a latent image;
  a nonvolatile memory, the memory including modeled parameters, the modeled parameters including one of temperature and pressure relative to scan misalignment; and
  a controller for producing the latent image on the photoconductor to create a printed image from the latent image, wherein the controller has local or remote access to compare modeled and learned parameters characterizing the scan lines to printed scan lines of the printed image;
  wherein the modeled parameters include misalignment profiles, each profile corresponding to a different misalignment value for one of pressure and temperature, one or more of the misalignment profiles are substantially V-shaped having an apex substantially along a centerline of the scan lines, and the one or more of the misalignment profiles provides a misalignment amount y which approximately follows the equation $y(x) = [((2^{(ax)} - 1)mx)/(2^{(ax)} + 1)) + b]$, where x is a distance from the centerline, a is a value corresponding to a level of sharpness of a transition on the V-shaped profile that is based upon at least one of pressure and temperature, m is a slope value based upon at least one of pressure and temperature, b is a point intersecting a misalignment y-axis.

2. The device of claim 1, further including at least one sensor proximate to the photoconductor to reference a start and end of each of the scan lines in alternating directions.

3. The device of claim 2, wherein the memory stores a scan detect to print distance from the sensor to the start of imaging.

4. The device of claim 1, wherein the memory stores one of an ambient temperature, an ambient pressure, an expected amount of scan misalignment, and a scanning mechanism drive signal parameter.

5. The device of claim 4, wherein the scanning mechanism drive signal parameter is a pulse width of a sequence of pulses.

6. The device of claim 1, wherein the memory stores sensor delay information.

7. The device of claim 1, wherein the modeled parameters characterizing the scan lines include the other of temperature and pressure relative to scan misalignment.

8. The device of claim 1, wherein the controller connected to a sensor makes corrections relative to scan misalignment based on inputs received from the sensor.

* * * * *